US009465972B2

(12) United States Patent
Chung et al.

(10) Patent No.: US 9,465,972 B2
(45) Date of Patent: Oct. 11, 2016

(54) FINGERPRINT SENSOR AND ELECTRONIC DEVICE INCLUDING THE SAME

(71) Applicant: SAMSUNG ELECTRO-MECHANICS CO., LTD., Suwon (KR)

(72) Inventors: Il Kwon Chung, Suwon (KR); Joo Hyun Kim, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 433 days.

(21) Appl. No.: 14/212,572

(22) Filed: Mar. 14, 2014

(65) Prior Publication Data

US 2015/0189136 A1    Jul. 2, 2015

(30) Foreign Application Priority Data

Jan. 2, 2014 (KR) .................... 10-2014-0000308

(51) Int. Cl.
    *G06F 3/044*    (2006.01)
    *G06K 9/00*    (2006.01)
    *G02F 1/1333*    (2006.01)

(52) U.S. Cl.
    CPC ........... *G06K 9/00013* (2013.01); *G06F 3/044* (2013.01); *G06K 9/0002* (2013.01); *G02F 1/13338* (2013.01)

(58) Field of Classification Search
    None
    See application file for complete search history.

(56) References Cited

U.S. PATENT DOCUMENTS

| 2007/0258628 | A1* | 11/2007 | Schneider | A61B 5/1172 382/124 |
|---|---|---|---|---|
| 2008/0166028 | A1* | 7/2008 | Turek | G06K 9/0002 382/124 |
| 2010/0322550 | A1 | 12/2010 | Trott | |
| 2013/0136321 | A1 | 5/2013 | Lee et al. | |
| 2014/0355387 | A1* | 12/2014 | Kitchens, II | H04R 17/005 367/137 |
| 2014/0359757 | A1* | 12/2014 | Sezan | G06F 21/32 726/19 |

FOREIGN PATENT DOCUMENTS

| KR | 10-2010-0136433 | 12/2010 |
|---|---|---|
| KR | 10-2011-0095565 | 8/2011 |
| KR | 10-2013-0003241 | 1/2013 |
| KR | 10-2013-0060875 A | 6/2013 |
| KR | 10-2013-0066152 A | 6/2013 |

OTHER PUBLICATIONS

Korean Office Action issued on Jun. 15, 2016 in counterpart Korean Application No. 10-2014-0000308. (14 pages in Korean with English translation).

* cited by examiner

*Primary Examiner* — Adam R Giesy
(74) *Attorney, Agent, or Firm* — NSIP Law (57) ABSTRACT

There are provided a fingerprint sensor and an electronic device including the same. The fingerprint sensor includes a glass panel; a plurality of transducers arranged on edge regions of the glass panel, the plurality of transducers emitting ultrasonic wave signals toward inner surfaces of the glass panel and receiving the ultrasonic wave signals reflected from the inner surfaces of the glass panel; and a fingerprint sensing unit sensing a fingerprint based on the ultrasonic wave signals received by the plurality of transducers, the fingerprint sensing unit sequentially driving the plurality of transducers.

12 Claims, 6 Drawing Sheets

FINGERPRINT SENSOR AND ELECTRONIC DEVICE INCLUDING THE SAME

CROSS-REFERENCE TO RELATED APPLICATION

This application claims the benefit of Korean Patent Application No. 10-2014-0000308, filed on Jan. 2, 2014, with the Korean Intellectual Property Office, the disclosure of which is incorporated herein by reference.

BACKGROUND

The present disclosure relates to a fingerprint sensor and an electronic device including the same.

Fingerprint sensors are devices used to sense human fingerprints and have recently been used for determining whether to turn electronic devices on or off or whether to release a device from sleep mode, as well as having previously been applied to door locking apparatuses. In particular, unlike fingerprint sensors used in door locking apparatuses, swipe type fingerprint recognition sensors, commonly having small volumes, have been developed, and have been ever increasingly used in devices such as mobile devices.

Fingerprint sensors may be divided into ultrasonic type fingerprint sensors, infrared type fingerprint sensors, and capacitive type fingerprint sensors, depending on the operational principle thereof. Among these, ultrasonic type fingerprint sensors sense a fingerprint in a manner in which, when ultrasonic wave signals having a specific frequency are emitted from a plurality of piezoelectric sensors and are reflected from valleys and ridges of a fingerprint, differences in acoustic impedance between signals reflected from valleys and those reflected from ridges are measured by the very same piezoelectric sensors which have emitted the ultrasonic wave signals. In addition to simply detecting fingerprints, ultrasonic type fingerprint sensors have an advantage in that they may generate ultrasonic waves in pulse form so as to detect the Doppler effect due to pulse reverberations, so that bloodstream in a finger may be detected, thereby preventing the use of fake fingerprints.

Recently, ensuring the security of mobile devices such as laptop computers and mobile phones has become an important issue, and accordingly, fingerprint sensors have been increasingly employed therein. However, since mobile devices are constantly being reduced in size, it may be difficult to install fingerprint sensors therein, and even if such sensors are installed, a degree of freedom of the positioning thereof may be somewhat limited.

RELATED ART DOCUMENT (Patent Document 1) Korean Patent Publication No. 1136153

SUMMARY

An aspect of the present disclosure may provide a fingerprint sensor capable of sensing a fingerprint from ultrasonic signals emitted from edge regions of a glass panel, provided as a cover lens for a touch panel and a display panel, reflected off the glass panel and returned to the edge regions, and an electronic device including the same.

According to an aspect of the present disclosure, a fingerprint sensor may include: a glass panel; a plurality of transducers arranged on the edge regions of the glass panel, the plurality of transducers emitting ultrasonic wave signals toward inner surfaces of the glass panel and receiving the ultrasonic wave signals reflected on the inner surfaces of the glass panel; and a fingerprint sensing unit sensing a fingerprint based on the ultrasonic wave signals received by the plurality of transducers, the fingerprint sensing unit sequentially driving the plurality of transducers.

The glass panel may be shaped as a hexahedron defined by a specific height and faces perpendicular to one another.

The edge regions may include lateral faces of the hexahedron and regions distant from edges of the faces at a predetermined distance.

Each of the plurality of transducers may include a piezoelectric sensor.

Each of the plurality of transducers may be arranged on two non-opposing edge regions, wherein an ultrasonic wave emitted from a transducer among the plurality of transducers arranged on the two non-opposing edge regions may be reflected from the glass panel and then received by that transducer.

Each of the plurality of transducers may be arranged on at least one edge region, wherein the ultrasonic wave signals may be emitted in a direction intersecting a direction in which the plurality of transducers is arranged.

The plurality of transducers may be arranged on two edge regions that are opposing to each other, wherein ultrasonic wave signals emitted from transducers arranged on one of the two edge regions are reflected from the glass panel and then received by transducers arranged on the other one of the two edge regions.

The fingerprint sensing unit may adjust a radiation angle at which an ultrasonic wave is emitted from one of the plurality of transducers level by level.

The fingerprint sensing unit may sense the fingerprint based on the radiation angles and intensity of the ultrasonic wave signals reflected according to the radiation angles and received by the plurality of transducers.

The fingerprint sensing unit may sense a plurality of fingerprints input on the glass panel simultaneously.

According to another aspect of the present disclosure, an electronic device may include: a fingerprint sensor including a glass panel, a plurality of transducers arranged on the edge regions of the glass panel, the plurality of transducers emitting ultrasonic wave signals toward inner surfaces of the glass panel and receiving the ultrasonic wave signals reflected from the inner surfaces of the glass panel, a fingerprint sensing unit sensing a fingerprint based on the ultrasonic wave signals received by the plurality of transducers; and a display panel integrally formed with the glass panel.

The glass panel may be used as a cover lens for the display panel.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
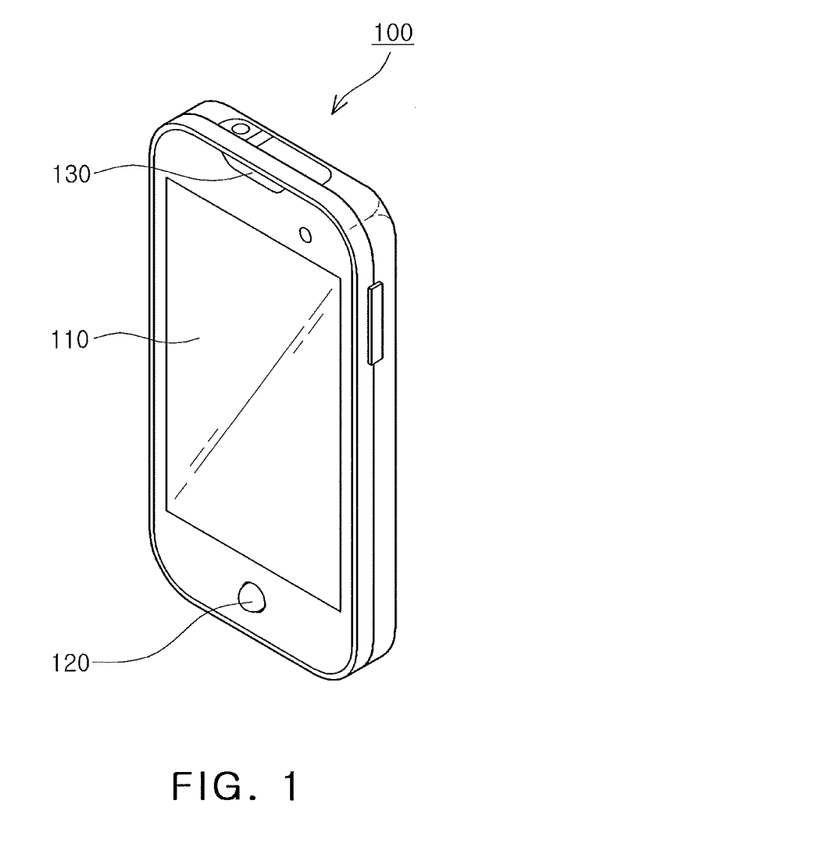
FIG. 1 is a perspective view showing an appearance of an electronic device including a fingerprint sensor according to an exemplary embodiment of the present disclosure.

FIG. 1 is a perspective view showing an appearance of an electronic apparatus including a fingerprint sensor according to an exemplary embodiment of the present disclosure.

Referring to FIG. 1, the electronic apparatus 100 according to the exemplary embodiment may include a display device 110 for displaying a screen, an input unit 120, an audio unit 130 for outputting a voice, and a touch screen device. A fingerprint sensor according to the exemplary embodiment may be integrated with the touch screen device and the display device 110.

It is common in mobile devices that a touch screen device is integrated with a display device, and such a touch screen device needs to have so high light transmittance that a screen displayed on the display device can be seen through the touch screen device. Therefore, the touch screen device may be implemented by forming a sensing electrode using a transparent and electrically conductive material such as indium tin oxide (ITO), indium zinc oxide (IZO), zinc oxide (ZnO), carbon nano tube (CNT), or graphene on a base substrate formed of a transparent film material such as polyethylene terephthalate (PET), polycarbonate (PC), polyethersulfone (PES), polyimide (PI), polymethylmethacrylate (PMMA), or the like. In addition, the sensing electrode may be implemented as a fine conductor line formed of one of Ag, Al, Cr, Ni, Mo and Cu or an alloy thereof.

The touch screen device may include a wiring pattern disposed at a bezel region thereof, wherein the wiring pattern is connected to the sensing electrode formed of the transparent and conductive material. Since the wiring pattern is visually shielded by the bezel region, it may also be formed of a metal material such as silver (Ag), copper (Cu), or the like.

Since the touch screen device according to the exemplary embodiment is of a capacitive type, the touch screen device may include a plurality of electrodes having a predetermined pattern. Further, the touch screen device may include a capacitance sensing circuit to sense a change in the capacitance generated in the plurality of electrodes, an analog-digital converting circuit to convert an output signal from the capacitance sensing circuit into a digital value, and a calculating circuit to determine if a touch input is made based on the converted data of the digital value.

Figure 2:
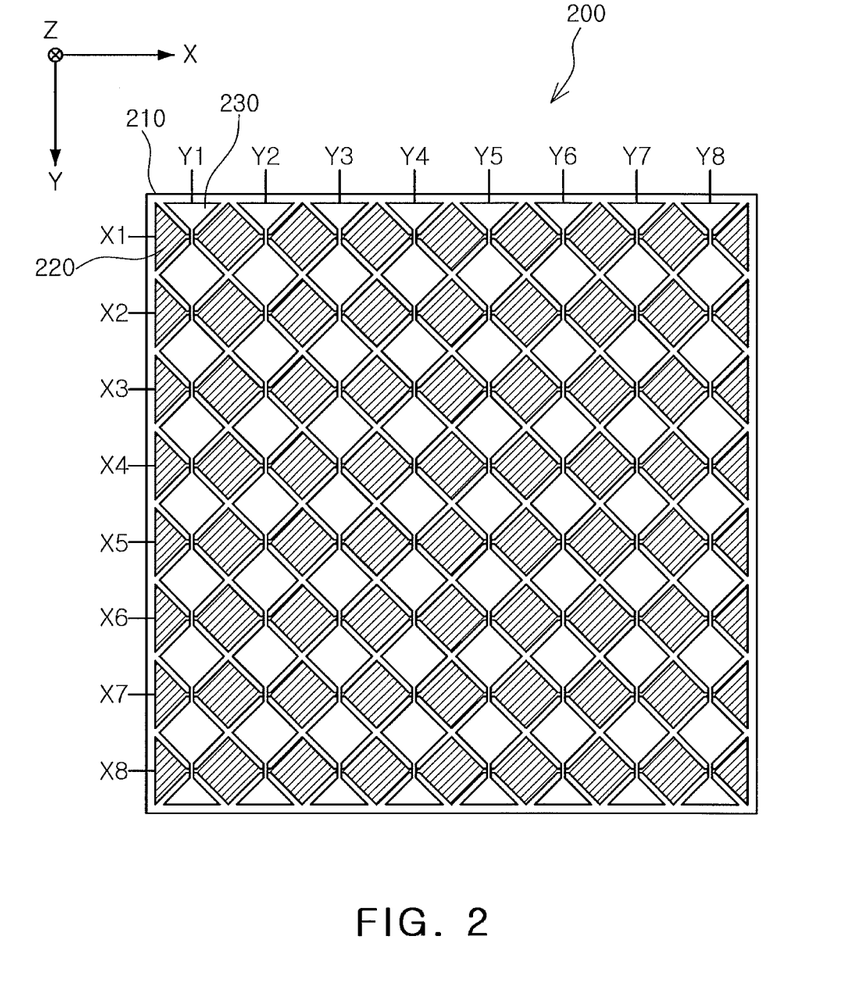
FIG. 2 is a view showing a touch panel of a touch screen device which may be included in an electronic apparatus according to an exemplary embodiment of the present disclosure.

FIG. 2 is a view showing a touch panel of a touch screen device which may be included in an electronic apparatus according to an exemplary embodiment of the present disclosure.

Referring to FIG. 2, the touch panel 200 may include a substrate 210 and pluralities of electrodes 220 and 230 provided on the substrate 210. Although not shown in FIG. 2, each of the plurality of electrodes 220 and 230 may be electrically connected to a wiring pattern on a circuit board attached to one end of the substrate 210 through a wiring and a bonding pad. The circuit board may have a controller integrated circuit mounted thereon so as to detect sensing signals generated in the plurality of electrodes 220 and 230 and may determine whether a touch input is made based on the detected sensing signals.

The plurality of electrodes 220 and 230 may be formed on one surface or both surfaces of the substrate 210. Although the plurality of electrodes 220 and 230 are shown to have a lozenge- or diamond-shaped pattern in FIG. 2, it is apparent that the plurality of electrodes 220 and 230 may have a variety of polygonal shapes such as rectangle and triangle.

The plurality of electrodes 220 and 230 may include first electrodes 220 extending in the x-axis direction, and second electrodes 230 extending in the y-axis direction. The first electrodes 220 and the second electrodes 230 may be provided on both surfaces of the substrate 210 or may be provided on different substrates 210 such that they may intersect with each other. If all of the first electrodes 220 and the second electrodes 230 are provided on one surface of the substrate 210, an insulating layer may be partially formed at intersection points between the first electrodes 220 and the second electrodes 230.

On the regions in which wiring connecting to the pluralities of electrodes 220 and 230 is provided, other than the region in which the pluralities of electrodes 220 and 230 are formed, a printed region, i.e., a bezel region may be formed on the substrate 210 so as to hide the wiring typically formed of an opaque metal material.

A device, electrically connected to the plurality of electrodes 220 and 230 to sense a touch input, detects a change in capacitance generated in the plurality of electrodes 220 and 230 by a touch input to sense the touch input based on the detected change in capacitance. The first electrodes 220 may be connected to channels defined as D1 to D8 in the controller integrated circuit to receive predetermined driving signals, and the second electrodes 230 may be connected to channels defined as S1 to S8 to be used by the display device to detect a sensing signal. Here, the controller integrated circuit may detect a change in mutual-capacitance generated between the first and second electrodes 220 and 230 as the sensing signal, in such a manner that the driving signals are sequentially applied to the first electrodes 220 and a change in the capacitance is simultaneously detected from the second electrodes 230.

Figure 3:
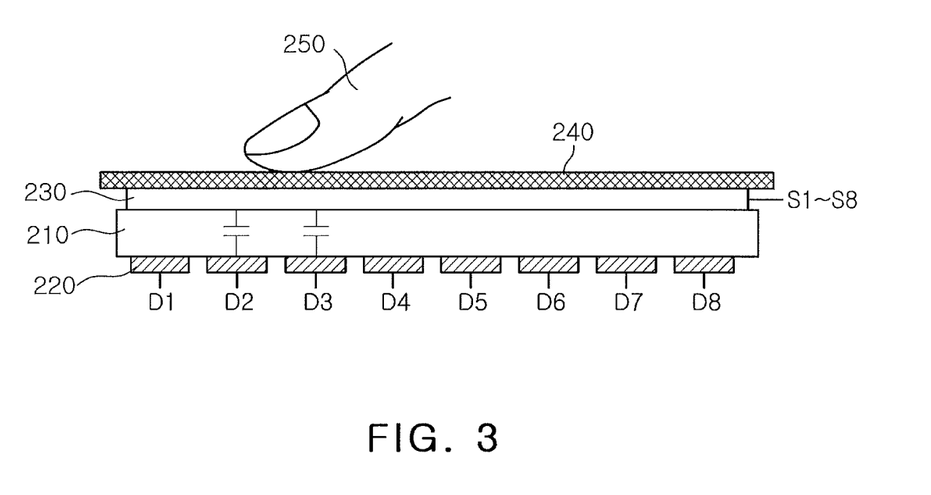
FIG. 3 is a cross-sectional view of the touch panel illustrated in FIG. 2.

FIG. 3 is a cross-sectional view of the touch panel illustrated in FIG. 2. FIG. 3 is a cross-sectional view of the panel unit 200 illustrated in FIG. 2 taken in the y-z plane, in which the panel unit 200 may further include a cover lens 240 that receives a touch input, in addition to the substrate 210 and the pluralities of electrodes 220 and 230 described with reference to FIG. 2. The cover lens 240 is provided on the second electrodes 230 used in detecting sensing signals, to receive a touch input from a touching object 250 such as a finger.

When driving signals are sequentially applied to the first electrodes 220 through the channels D1 to D8, mutual-capacitance is generated between the first electrodes 220, to which the driving signals are applied, and the second electrodes 230. When the driving signals are sequentially applied to the first electrodes 220, a change in the mutual-capacitance is made between the first electrode 220 and the second electrode 230 close to the area with which the touching object 250 comes in contact. The change in the mutual-capacitance may be proportional to the overlapped area between the region that the touching object 250 comes into contact, and the region that the first electrodes 220, to which the driving signals are applied, and the second electrodes 230 form. In FIG. 3, the mutual-capacitance generated between the first electrodes 220 connected to channel D2 and D3, respectively, and the second electrodes 230 is influenced by the touching object 250.

Figure 4:
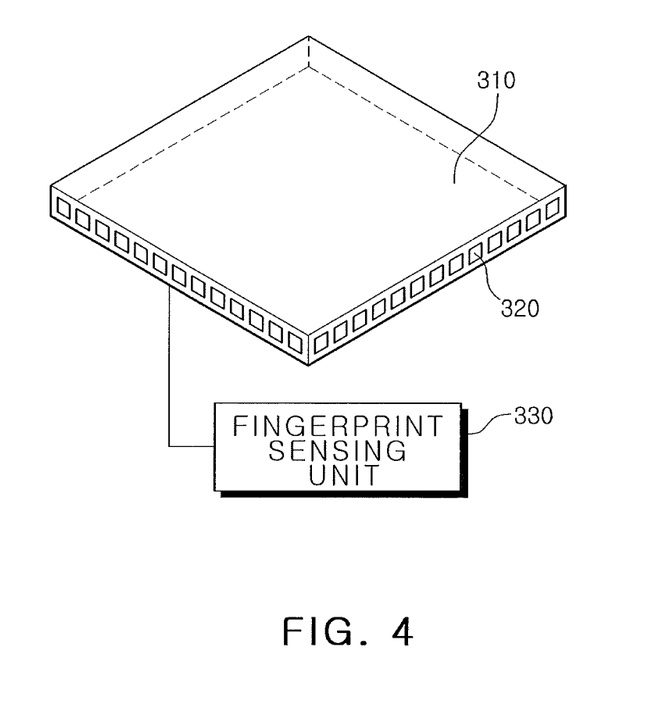
FIGS. 4 and 5 are views showing a fingerprint sensor according to an exemplary embodiment of the present disclosure.
Figure 5:
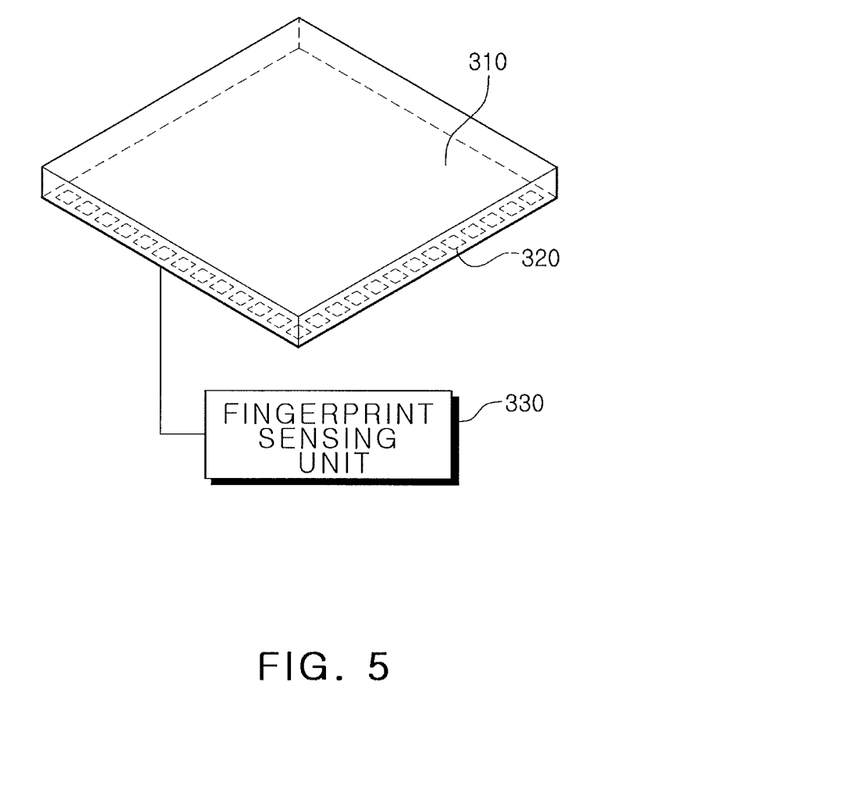

FIGS. 4 and 5 are views showing a fingerprint sensor according to an exemplary embodiment of the present disclosure.

Referring to FIG. 4, the fingerprint sensor according to the exemplary embodiment may include a glass panel 310, a plurality of transducers 320 arranged on one side of the glass panel 310, and a fingerprint sensing unit 330 electrically connected to the plurality of transducers to sense a fingerprint.

The glass panel 310 is an element that may be used as a cover lens attached on the top surface of a touch panel or a display panel and may function as a waveguide in which ultrasonic wave signals incident on the glass panel 310 are reflected. The glass panel 310 may have be shaped as a hexahedron defined by specific height and faces perpendicular to one another and may reflect ultrasonic wave signals incident thereon.

Each of the plurality of transducers 320 may include a piezoelectric sensor to thereby emit an ultrasonic wave toward inner surfaces of the glass panel 310 and receive the ultrasonic wave reflected from the inner surfaces of the glass panel 310. The piezoelectric sensor may include a pillar part including at least one material of PZT, PST, Quartz, (Pb, Sm)TiO$_3$, PMN(Pb(MgNb)O$_3$)—PT(PbTiO$_3$), PVDF and PVDF-TrFe, and electrodes disposed upper and bottom faces of the pillar part.

The plurality of transducers 320 may be arranged on edge regions of the glass panel 310, which correspond to bezel regions of a touch panel. Specifically, the edge regions may include lateral faces of the hexahedral glass and outer regions of faces defining the hexahedron, i.e., regions distant from edges of the faces at a predetermined distance.

The fingerprint sensor according to the exemplary embodiment may sense a fingerprint by measuring a difference in acoustic impedance between ultrasonic wave signals reflected from valleys and those reflected from ridges, and thus it is necessary to arrange as many transducers as possible, e.g., hundreds of transducers, in a specific area in order to accurately sense a fingerprint.

The plurality of transducers 320 may be arranged on two lateral faces that are not opposing to each other, may be arranged on two lateral faces that are opposing to each other, or may be arranged on all of the four surfaces. Alternatively, it may be arranged on three lateral faces or on one lateral face. Moreover, it may be arranged on the bottom face of the glass panel 310, instead of lateral faces of the glass panel 310.

When the plurality of transducers 320 is arranged in the x-axis direction, it emits ultrasonic wave signals in the y-axis direction. When the plurality of transducers 320 is arranged on two lateral faces that are not opposing to each other among the four lateral faces of the glass panel 310 as shown in FIG. 4, an ultrasonic wave emitted from a transducer 320 may be received by that transducer.

In addition, when the plurality of transducers 320 is arranged on two lateral faces that are opposing to each other, it may emit ultrasonic wave on one lateral face and may received on the other lateral face of the two lateral faces.

The fingerprint sensing unit 330 may be electrically connected to the electrodes of the plurality of transducers 320 and may apply AC voltage having specific frequencies to the electrodes. The fingerprint sensing unit 330 may apply AC voltage to the electrode of a piezoelectric sensor included each of the plurality of transducers 320, in which a piezoelectric element vibrates by the AC voltage applied to the electrode so that an ultrasonic signal having a specific frequency, e.g., a resonant frequency of 10 MHz is emitted to the outside.

The fingerprint sensing unit 330 may apply AC voltage sequentially to the plurality of transducers 320 so that ultrasonic signals are sequentially emitted from the plurality of transducers 320.

The ultrasonic signals emitted from the plurality of transducers 320 are reflected from the inner surface of the glass panel 310 which behaviors as a waveguide and propagate. There is a difference in the intensity of the ultrasonic signal between when it is reflected from a finger of a human that is in contact with the upper surface of the glass panel 310 and when it is reflected from the glass panel with no touching object.

Such a difference in the intensity of the ultrasonic signals is resulted from a difference in acoustic impedance between the glass panel 310 and the skin tissue of the finger and between the glass panel 310 and the air. The acoustic impedance is unique nature of a material and different materials have different acoustic impedance values. Therefore, different acoustic impedance results indifferent reflectivity, so that a difference in intensity of ultrasonic wave signals is caused.

Assuming that no object is in contact with a contact surface such as the upper surface of the glass panel 310, due to medium difference between the contact surface and the air, most ultrasonic wave signals generated from the transducers 320 do not pass through the contact surface but are reflected thereon, and return without loss. To the contrary, when an object including a fingerprint is in contact with the contact surface, some of ultrasonic wave signals emitted toward ridges of the fingerprints pass through the interfaces between the contact surface and the fingerprint, so that only some of the generated ultrasonic wave signals are reflected and return. The intensity of the ultrasonic wave signals that are reflected and return may be determined depending on the acoustic impedance of materials.

The fingerprint sensing unit 330 may calculate fingerprint patterns based on the difference in acoustic impedance. If the intensity of a reflected ultrasonic wave signal is weak, it is determined that the ultrasonic wave signal has been emitted toward ridges of the fingerprint. If the intensity of a reflected ultrasonic wave signal is strong, ideally substantially equal to the intensity of the emitted ultrasonic wave signal, it is determined that there is no touching object or that the ultrasonic wave signal has been emitted toward valleys of the fingerprint.

Figure 6A:
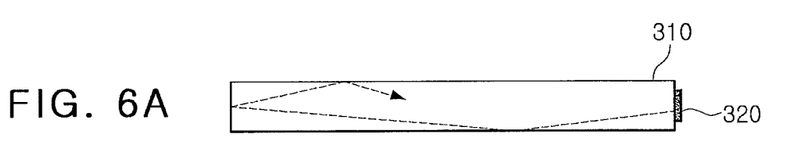
FIGS. 6A and 6B are views for illustrating the operation of a fingerprint sensor according to an exemplary embodiment of the present disclosure.
Figure 6B:
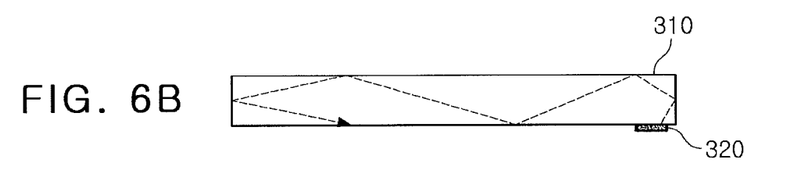

The ultrasonic wave signals emitted from the plurality of transducers 320 may have specific radiation angles as shown in FIGS. 6A and 6B. The fingerprint sensing unit 330 may adjust a radiation angle of one of the transducers 320 level by level, and may analyze the intensity of the ultrasonic wave signals according to the adjusted radiation angles to thereby sense the fingerprint. Since the position from which an ultrasonic wave signal is emitted toward inner surfaces of the glass panel 310 and the time at which an ultrasonic wave signal is received by the very same transducer which has emitted the ultrasonic wave signal may be determined depending on the radiation angle, the fingerprint sensing unit 330 may sense the fingerprint based on the radiation angle and the intensity of the ultrasonic wave signal.

The fingerprint sensing unit 330 may drive the plurality of transducers 320 one by one sequentially in the above-described manner, so that is may utilize the entire surfaces of the glass panel to sense a finger print. In addition, fingerprints of multiple fingers may be sensed simultaneously, as well as a specific finger.

As set forth above, according to exemplary embodiments of the present disclosure, a glass panel of a cover lens for a display panel or touch panel of a mobile device or the like is utilized as a region for sensing a fingerprint, such that the need for a dedicated space for installing an existing fingerprint sensor is eliminated.

In addition, by utilizing the entire surface of the glass panel as a region for sensing a fingerprint, fingerprints of multiple fingers may be sensed simultaneously, as well as a specific finger.

While exemplary embodiments have been shown and described above, it will be apparent to those skilled in the art that modifications and variations could be made without departing from the spirit and scope of the present disclosure as defined by the appended claims.

What is claimed is:

1. A fingerprint sensor, comprising:
   a glass panel;
   a plurality of transducers arranged on edge regions of the glass panel, the plurality of transducers emitting ultrasonic wave signals toward inner surfaces of the glass panel and receiving the ultrasonic wave signals reflected from the inner surfaces of the glass panel; and
   a fingerprint sensing unit sensing a fingerprint based on the ultrasonic wave signals received by the plurality of transducers, the fingerprint sensing unit sequentially driving the plurality of transducers.

2. The fingerprint sensor of claim 1, wherein the glass panel has be shaped as a hexahedron defined by specific height and faces perpendicular to one another.

3. The fingerprint sensor of claim 2, wherein the edge regions include lateral faces of the hexahedron and regions distant from edges of the faces at a predetermined distance.

4. The fingerprint sensor of claim 1, wherein each of the plurality of transducers includes a piezoelectric sensor.

5. The fingerprint sensor of claim 1, wherein each of the plurality of transducers is arranged on two non-opposing edge regions, wherein a ultrasonic wave signal emitted from a transducer among the plurality of transducers arranged on the two non-opposing edge regions is reflected from the glass panel and then received by that transducer.

6. The fingerprint sensor of claim 1, wherein each of the plurality of transducers is arranged on at least one edge region, wherein the ultrasonic wave signals are emitted in a direction intersecting a direction in which the plurality of transducers is arranged.

7. The fingerprint sensor of claim 1, wherein the plurality of transducers is arranged on two edge regions that are opposing to each other, wherein ultrasonic wave signals emitted from transducers arranged on one of the two edge regions are reflected from the glass panel and then received by transducers arranged on the other one of the two edge regions.

8. The fingerprint sensor of claim 1, wherein the fingerprint sensing unit adjusts a radiation angle at which an ultrasonic wave signal is emitted from one of the plurality of transducers level by level.

9. The fingerprint sensor of claim 8, wherein the fingerprint sensing unit senses the fingerprint based on the radiation angles and intensity of the ultrasonic wave signals reflected from the glass panel according to the radiation angles and received by the plurality of transducers.

10. The fingerprint sensor of claim 1, wherein the fingerprint sensing unit senses a plurality of fingerprints input on the glass panel simultaneously.

11. An electronic device, comprising:
    a fingerprint sensor including a glass panel, a plurality of transducers arranged on edge regions of the glass panel, the plurality of transducers emitting ultrasonic wave signals toward inner surfaces of the glass panel and receiving the ultrasonic wave signals reflected from the inner surfaces of the glass panel, and a fingerprint sensing unit sensing a fingerprint based on the ultrasonic wave signals received by the plurality of transducers; and
    a display panel integrally formed with the glass panel.

12. The electronic device of claim 11, wherein the glass panel is used as a cover lens for the display panel.

* * * * *